Patented Apr. 29, 1952

2,594,421

UNITED STATES PATENT OFFICE 2,594,421

DETERGENT COMPOSITION

Earl W. Gluesenkamp, Centerville, Ohio, assignor to Monsanto Chemical Company, St. Louis, Mo., a corporation of Delaware No Drawing. Application February 26, 1948, Serial No. 11,319

2 Claims. (Cl. 252—140)

The present invention relates to a new, nitrogen-containing detergent composition, particularly useful in the presence of hardness-producing metal ions.

An object is to provide washing compositions of unusually high detersive efficiency, particularly for use in areas having very hard water. Other objects will appear obvious, or are described in this specification.

The present invention sets forth a new, detersive composition employing nitrogen-containing condensation products. Such compositions are particularly free from the disadvantage of precipitation by metallic ions in water and are, therefore, of value in many industrial applications. Such condensation products are also advantageously employed in connection with conventional builders utilized in providing commercial detergent compositions. The new compositions are advantageously employed in the presence of hardness such as is common in large areas extending across many states, where the presence of hardness-forming cations in the water render ordinary soaps inefficient in detergent operations. The present invention, in providing a detergent composition which may be in essence non-ionic, allows the use of hard water while still providing high efficiency in the ordinary washing operations.

The invention is concerned with detergent mixtures of particular efficiency which may be made by the combination of ethylene oxide with certain aliphatic high molecular weight nitriles. I have found that the aliphatic nitriles, whether normal or branched chain in structure, may be condensed with ethylene oxide to provide valuable detergent compositions.

The present compositions are produced by the use of molecular ratios of 5 to 20 of ethylene oxide based upon the aliphatic nitrile. A preferred range in the same relationship is 6 to 15 moles of ethylene oxide.

In order that the invention may be clearly understood and readily carried into effect, some practical methods of carrying out the process according to the invention will now be described in somewhat greater detail by way of example.

Example 1

In order to prepare the condensation product of oleic acid nitrile, $C_{18}H_{33}N$, with ethylene oxide 52.6 grams of the nitrile were charged to a reactor equipped with a stirrer. As a catalyst, 1% of potassium hydroxide, based upon the nitrile, was added to the nitrile. The mixture was heated to a temperature of about 150° C., at which temperature ethylene oxide was passed into the well agitated mixture. The temperature was maintained in the range of 150° C. to 160° C. during the addition of ethylene oxide in the ratio of 10 moles to one mole of the nitrile. The completed non-ionic condensation product was then cooled and tested for detergency efficiency. The compound per se displayed good detergency; the compound built as a commercial product utilizing 20% of the condensation product together with 40% starch and 40% tetrasodium pyrophosphate when subjected to comparison tests showed the detersive efficiency summarized in the table below.

Example 2

An oleic acid nitrile condensation product with ethylene oxide was made in the same manner as that of Example 1, except that the addition of ethylene oxide was carried to the 15:1 ratio of ethylene oxide with respect to the nitrile acceptor.

This preparation was also tested for detergency, and yielded the results shown in the table below.

Example 3

The use of a technical grade of nitrile, preponderantly the 18 carbon atom aliphatic nitrile, was shown to provide a condensation product. 54.2 grams of the nitrile raw material was charged to the reactor, together with 1% of potassium hydroxide catalyst. It was found in a series of such preparations that strong alkalies such as sodium and potassium hydroxide, as well as the corresponding carbonates, could be utilized as the catalyst in all of the nitrile condensations with ethylene oxide.

The addition of ethylene oxide to the nitrile mixture was carried out at approximately 150° C. Ethylene oxide was added until the molar ratio of this compound to the nitrile raw material reached the value of 6:1. This product was utilized in detergency testing, and found to yield a useful composition for washing.

Example 4

The mixed nitriles, as employed in Example 3, were similarly condensed with ethylene oxide until 10 moles of this compound were condensed with one mole of the nitrile. The product was tested for detergency and was found to give the values set out in the table below.

Example 5

The technical grade nitriles employed in Example 3 were here condensed with ethylene oxide to give a 15:1 molar ratio, based upon the nitrile raw material. The condensation product was also found to provide a useful detergent per se and in the built form, and also showed a softening effect on fabrics which were washed with this composition both in the unbuilt and in the built or compounded form.

It has been found as a result of further experimental work that nitriles having from 8 to 18 carbon atoms in an aliphatic chain may be used to provide the detergent compositions of the present invention. Aliphatic nitriles thus found useful may have saturated or unsaturated chains, although it has been found that the presence of aromatic radicals in the nitrile are undesirable and that the presence of aromatic constituents is undesirable if efficient detergent compositions are to be attained.

An entirely unobvious effect accomplished by the nitrile-ethylene oxide condensation products is the achievement of detergency without the necessity of providing an agent which introduces the wetting function. While it might be supposed on theoretical ground that a detergent must also display wetting ability, it is seen in the present instance that extremely efficient detergents can be made without the concomitant wetting action generally considered necessary. This is brought out in the table of test data below, in which are recorded the wetting values of the present compositions as tested in the pure form by the standard Draves-Clarkson test, described in the 1935-1936 Yearbook of the American Association of Textile Colorists at pages 162–165. The wetting data shown establish that the present condensation products do not have superior efficiency in wetting a standard skein, but do exhibit outstanding detergency both in the unbuilt form and in the typical commercial built composition.

The detergency tests summarized in the table below are based upon the use of hard water having a standard hardness of 300 p. p. m. The detergency tests were carried out with the Launderometer method for evaluating detergency, described by Jay C. Harris in Soap and Sanitary Chemicals for August and September 1943. However, instead of reporting the results as per cent of soil removed, as described by Harris, the effectiveness of the detergent compositions is compared with that of Gardinol WA (sodium lorol sulfate), the value of which is taken as 100%. Accordingly, the detergency data herein reported are referred to as "relative" detergency, it being understood that the comparison is made as stated.

Table of test data

| Sample No. | Detergency in Hard Water | | Wetting Time Unbuilt |
|---|---|---|---|
| | Unbuilt | Built | |
| Ex. 4 | 117 | 122 | 180+ |
| Ex. 5 | 105 | 107 | 180+ |
| Ex. 1 | 106 | 117 | 180+ |
| Ex. 2 | 101 | 107 | 180+ |

From the above data it is apparent that with respect to detergent efficiency, the nitrogen-containing reaction product of the aliphatic nitriles with ethylene oxide is superior to the reference standard synthetic detergent, and therefore makes available a new detergent particularly useful in hard water washing.

A series of further tests showed that in addition to the typical examples set forth above, the ethylene oxide ratios for greatest efficiency were in the range of 5 to 20 moles based upon the nitrile. A preferred range in this relationship is 6 to 15 moles of ethylene oxide per mole of the aliphatic nitrile. It has also been found that the nitriles having from 8 to 18 carbon atoms are most useful in providing the detergent compositions. Both normal compounds having straight chains and also branched chain nitriles were useful in the present invention. An unobvious advantage resulting from the use of branched chain nitriles is the enhancement of the property of wetting.

The aliphatic nitriles may also be saturated or unsaturated, but the presence of aromatic compounds or substituents is undesirable, and should be avoided since it is only non-aromatic nitriles which provide the necessary physical properties. Amino substituents associated with the nitrile group likewise are undesirable. It is essential that the nitrile group or radical N≡C— in direct combination with an aliphatic chain be present. The condensation product thus produced with the addition of a molar ratio of 6 to 15 moles of ethylene oxide provides the molecular configuration essential to achieve the quality of detergency sought by the present invention.

The data on the built or formulated detergents in the above table were obtained by the use of compositions employing not only the nitrogen-containing condensation products, but also typical builders used in commercial detergents. The above compositions employ 20% of the nitrile-ethylene oxide condensation product in combination with 40% of starch and 40% of tetrasodium pyrophosphate (TSPP).

For producing commercial detergent compositions, the present nitrogen-containing condensation products may be mixed with any alkali, e. g., sodium or potassium carbonates or phosphates. Suitable phosphates are any of the polyphosphates, such as crystalline sodium tripolyphosphate, $Na_5P_3O_{10}$, or sodium tetraphosphate, $Na_6P_4O_{13}$, or fused or sintered products approximating these compositions. Sodium hexametaphosphate, sodium pyrophosphate and particularly the tetrasodium pyrophosphate, $Na_4P_2O_7$, may be used, these products being preferred in the anhydrous form. The alkali metal orthophosphates may also be employed. Typical members of this group are trisodium orthophosphate, disodium orthophosphate, or monosodium orthophosphate. The above products may be used as such or in mixtures or in admixture with other inorganic water-soluble salts such as soda ash, sodium sulfate, sodium borate, etc.

Colloidal carbohydrate material such as starch, methyl cellulose or carboxy methyl cellulose are advantageously added to mixtures of the said condensation product with or without alkali metal phosphate. The amount of the carbohydrate material added may vary over wide limits, such as a minimum of 80%. However, the adjunct material such as the cellulose ethers or alkyl cellulose ethers are preferably used in the range of 0.1% to 5% by weight, and in combination with starch.

The starch employed is the ordinary corn or potato starch and may be introduced in the form commonly known as pearl starch or in the finely powdered form. It may be employed in amounts up to 80% by weight of the mixture. Dextrin materials, such as are ordinarily derived from starch by various degradation processes, may also be used.

When methyl cellulose is employed in this relationship, it is utilized in its low viscosity form. The commercial product designated as Methocel 15 cps. is suitable, for example.

Carboxy methyl cellulose is also a desirable additive to the present built formulations. This compound is described in the Journal of Industrial and Engineering Chemistry, 37, 942. The material is available in various forms. The type which is soluble in alkalies and which is known as the "low substituted" type is preferred for compositions adjusted to an alkaline pH as will generally be desirable.

The detergent ability of nitrile-ethylene oxide condensation products may be considerably improved by mixing the product with both a phosphate salt and also a colloidal carbohydrate material such as starch, together with methyl cellulose or carboxy methyl cellulose. Desirably the 3-component compositions should contain between 15 and 30 parts of the condensation product, from 20 to 50 parts of phosphate, and the balance of a colloidal carbohydrate material to aggregate 100 parts by weight of the mixed compositions.

The above commercial formulations may also include mixtures with other inorganic water-soluble salts such as soda ash, sodium sulfate, sodium borate and the like. Mixtures with other synthetic detergents such as organic sulfonates and sulfates, or condensation products of ethylene oxide with organic acids, alcohols or mercaptans may also be used. Furthermore, since the nitrile-ethylene oxide reaction products are pasty materials of the low melting point, for detergent purposes, they are preferably mixed with adjunct materials such as starch, bentonite, kieselguhr, etc. in proportions such as will give a dry, powdery product.

The dry, powdery form of my improved detergent may be packaged and sold as such or in built form for use in washing machines such as the automatic type, wherein it may conveniently be proportioned by means of automatic feeding or proportioning equipment. In this relationship, I may also market such packages in unit sizes as are adapted for average sized home washings, so that no further measurement is necessary and the entire unitary package may be used in an automatic washing machine.

Representative built compositions embodying the present nitrile-ethylene oxide condensation product are shown below:

|  | Percent |
|---|---|
| 1. Product of Example 4 | 20 |
| TSPP | 40 |
| Starch | 40 |
| 2. Product of Example 4 | 20 |
| TSPP | 40 |
| Starch | 35 |
| Carboxy methyl cellulose | 5 |

It should be understood that the present invention is not limited to the specific procedure and compounds hereinbefore disclosed, but that it extends to all equivalent methods covered by the generic and specific features of my invention herein-described and all statements of the invention which, as a matter of language, might be said to fall therebetween.

What I claim is:

1. A detergent composition comprising the condensation product of oleic nitrile with ethylene oxide, the said condensation product containing at least 6, but not more than 15, moles of ethylene oxide per mole of said oleic nitrile, 15 to 30 parts by weight; tetrasodium pyrophosphate, 20 to 50 parts by weight; and the balance to make 100 parts by weight of a mixture of starch and carboxy methyl cellulose.

2. A detergent composition comprising approximately 20% by weight of the condensation product of oleic nitrile with ethylene oxide, the said condensation product containing at least 6 but not more than 15 moles of ethylene oxide per mole of said oleic nitrile, approximately 40% by weight of tetrasodium pyrophosphate, approximately 35% by weight of starch and approximately 5% by weight of carboxy methyl cellulose.

EARL W. GLUESENKAMP.

REFERENCES CITED

The following references are of record in the file of this patent:

UNITED STATES PATENTS

| Number | Name | Date |
|---|---|---|
| 2,085,706 | Schoeller et al. | June 29, 1937 |
| 2,174,762 | Scheutte et al. | Oct. 3, 1939 |
| 2,314,840 | Caryl | Mar. 23, 1943 |
| 2,335,194 | Nuesslein et al. | Nov. 23, 1943 |